May 17, 1938. M. F. KETAY ET AL 2,117,670
SALINITY INDICATOR
Filed Sept. 10, 1936
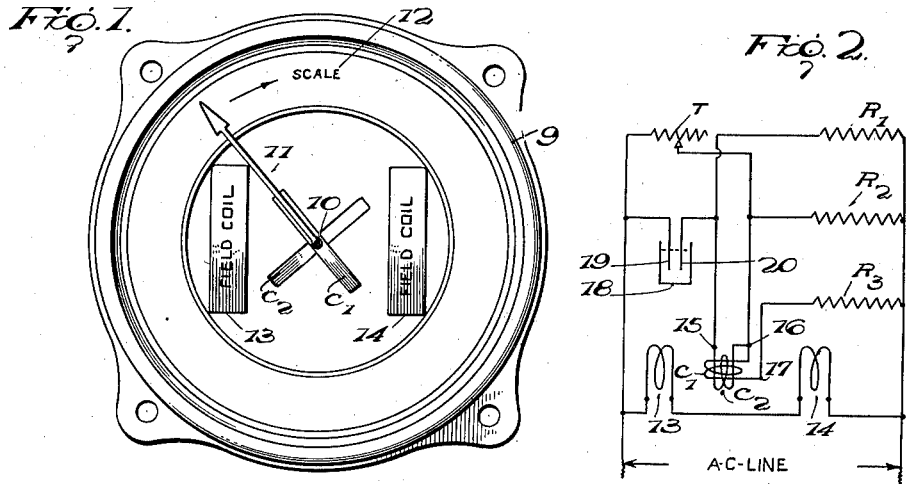
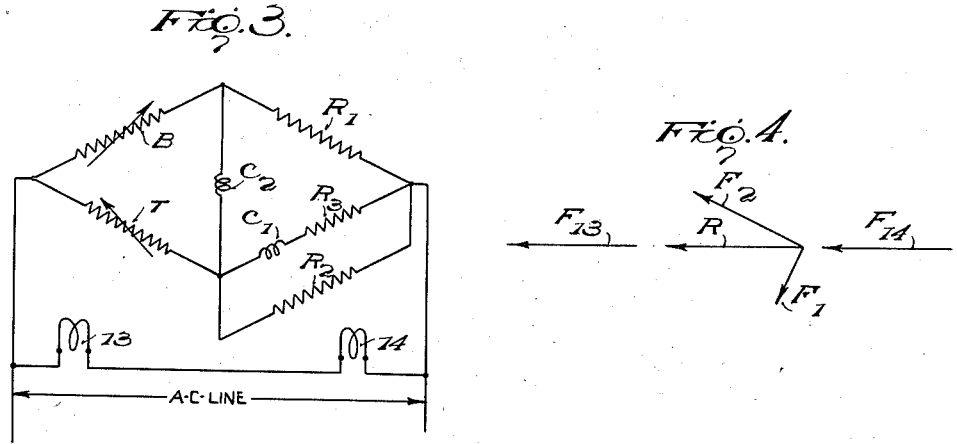
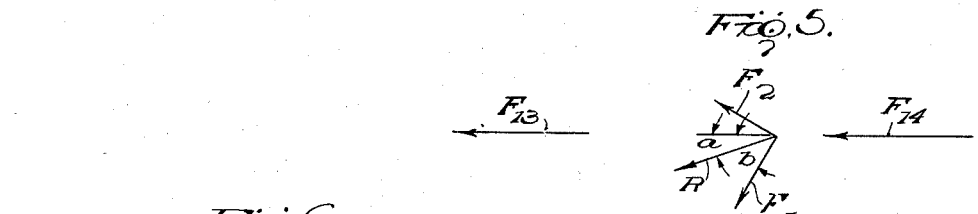
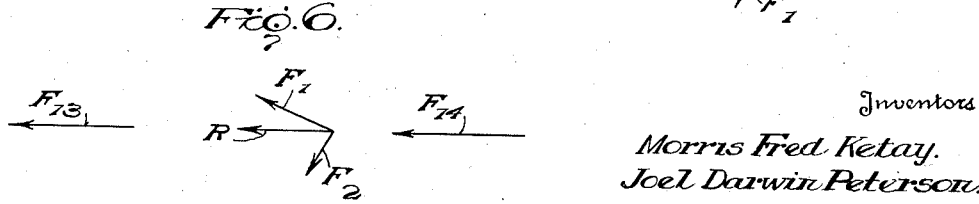
Inventors
Morris Fred Ketay.
Joel Darwin Peterson.
By Stephen Cerstvik
Attorney Patented May 17, 1938

2,117,670

UNITED STATES PATENT OFFICE 2,117,670

SALINITY INDICATOR

Morris Fred Ketay, Brooklyn, N. Y., and Joel Darwin Peterson, Roselle, N. J., assignors to Bendix Aviation Corporation, South Bend, Ind., a corporation of Delaware Application September 10, 1936, Serial No. 100,216

5 Claims. (Cl. 175—183)

This invention relates to devices for electrically measuring and indicating the saline content of fluids, and more particularly to the electrical circuits employed in salinity indicators of this type.

One of the objects of the invention is to provide an improved salinity indicating device in which is embodied a novel electric circuit for effecting movement of that element of the device the position of which serves as an indication of the degree of salinity of the fluid being tested.

Another object is to provide a new and improved electrical circuit for use in salinity indicators in which a modified form of Wheatstone bridge is utilized.

A further object is to provide a salinity indicator of the character referred to in which is included improved means for compensating for variations in the temperature of the fluid being tested.

Still another object is to provide an electrical salinity indicating device of improved construction and of greater accuracy than similar instruments hitherto known to the art.

These and other objects of the invention will appear more fully upon consideration of the detailed description of the embodiment of the invention which follows. Although only one specific circuit arrangement has been disclosed and illustrated in the accompanying drawing, it is to be expressly understood that this drawing is for purposes of illustration only and is not to be construed as a definition of the limits of the invention, reference being had for this latter purpose to the appended claims.

In the drawing, wherein like reference characters indicate like elements throughout the several views:

Fig. 1 is a view of the face of the meter or indicator of a salinity measuring and indicating device embodying the present invention with the fixed and movable coils of the electrical circuit indicated schematically, the positions of the movable coils and indicating pointer corresponding to a fluid of zero salinity;

Fig. 2 is a diagram of the electrical circuit of a salinity indicator constructed in accordance with the invention;

Fig. 3 is a schematic rearrangement of the circuit diagram of Fig. 2 more clearly illustrating the modified bridge circuit utilized by the present invention;

Fig. 4 is a vector diagram of the electromagnetic fields produced by the fixed and movable coils of the indicator when the salinity of the fluid being tested is zero;

Fig. 5 is a vector diagram similar to Fig. 4 but illustrating the conditions existing when the fluid is (a) of relatively slight salinity and (b) of sufficient salinity to just effect a balancing of the bridge circuit; and Fig. 6 is another vector diagram corresponding to a fluid the salinity of which is greater than that required to balance the bridge circuit.

As shown somewhat schematically and diagrammatically in Figs. 1, 2 and 3, the salinity measuring and indicating device of the present invention comprises an electrical meter so combined with a modified form of bridge circuit and a salinity cell as to give an accurate indication of the degree of salinity of the fluid being tested in the cell. Since the resistance to current flow through the salinity cell varies inversely with the temperature of the fluid as well as with its salinity, the indicator circuit also includes means for compensating for variations in the fluid temperature.

The meter or indicating portion of the device consists of movable and fixed elements mounted in a suitable casing 9 in such a manner that the position of the movable element at any instant constitutes a clear indication of the salinity of the fluid being tested. As illustrated, the movable element of the meter comprises a pair of circular coils of wire $C_1$ and $C_2$ mounted with their planes at right angles to one another and having a common diameter, indicated at 10, which serves as their axis of rotation. Coplanar with coil $C_1$, and fixed with respect thereto so as to rotate therewith about axis 10, is a suitable indicating element such as a pointer 11 adapted to travel over a scale 12 calibrated in terms of salinity. The fixed or field element of the meter consists of a pair of field coils 13 and 14, of somewhat larger diameter than movable coils $C_1$ and $C_2$, which are fixedly mounted adjacent the movable coils on opposite sides of axis 10 with their planes vertical and parallel to one another. The magnetic fields produced by coils 13 and 14 are coaxial and extend at right angles to axis 10. As indicated in Fig. 2, field coils 13 and 14 are connected in series across the terminals of the indicator, said terminals in turn being adapted for connection to any suitable source of alternating current. Movable coils $C_1$ and $C_2$ are electrically connected to the electric circuit of the indicator next to be described by three hair springs (not shown) of negligible torque, two of the springs being connected to the ends of the coils while the third spring is connected to the junction therebetween. The relative positions of these three springs are shown in the circuit diagram of Fig. 2 at the points marked 15, 16 and 17.

The elements of the indicator thus far described are combined and electrically connected with a salinity cell and a novel testing circuit in the manner illustrated in Fig. 2. As shown therein, the cell comprises a suitable container 18 for the fluid to be tested and a pair of electrodes 19 and 20 which are mechanically held in fixed and parallel spaced relation and completely immersed in the fluid in container 18. If desired, the salinity cell may be mounted in or secured to the indicator casing 9 and suitable connections provided for enabling the fluid to be tested to flow to and from the container 18. One of the electrodes of the cell, electrode 19 in the example illustrated, is connected to the same terminal of the indicator as field coil 13 while the other electrode 20 is connected to the opposite terminal through two parallel paths, one path including the fixed resistance $R_1$ and the other comprising movable coils $C_2$ and $C_1$ (in series) and a fixed resistance $R_3$ which serves to limit the current through the coils in the event of a short circuit of the electrodes. Connected in parallel with the cell and coil $C_2$ is a calibrated variable resistance T which is adapted to be manually adjusted to correspond to the temperature of the fluid being tested in the cell. Another fixed resistance $R_2$ may be shunted across coil $C_1$ and resistance $R_3$ in order to ensure a proper division of current flow between the coils $C_1$ and $C_2$. As is best illustrated by Fig. 3, the electrical circuit just described is in fact a modified form of Wheatstone bridge with the resistance B of the fluid in the cell and temperature compensating resistance T constituting the parallel variable legs of the bridge and the coil $C_2$ functioning as the bridge wire.

Referring now to Fig. 4, let it be assumed that the salinity of the fluid under test is zero—that is, the fluid contains no salt; the resistance of the fluid to the passage of alternating current then approaches an infinite value. Under these circumstances, if the terminals of the indicator be connected to a source of alternating current, the entire current will pass through that leg of the bridge circuit containing the temperature compensating resistance T and then divide between the coils $C_1$ and $C_2$. If at any instant the magnetic fields of fixed coils 13 and 14 are as represented by the vectors $F_{13}$ and $F_{14}$, the circuit is such that the fields of coils $C_1$ and $C_2$ will be represented by the vectors $F_1$ and $F_2$, as shown. The resultant of the latter two perpendicularly directed fields will be a field represented by the vector R which will attempt to align itself with the main field $F_{13}$, $F_{14}$ of the fixed coils 13 and 14. Inasmuch as the coils $C_1$ and $C_2$ are free to rotate about the axis 10, the tendency to alignment of the resultant and main fields will place the coils $C_1$ and $C_2$ in the positions indicated which, in turn, will carry the pointer 11 over the scale 12 to the position shown in Fig. 1. When the direction of the current flow is opposite to that just considered, the directions of the vectors of Fig. 4 will be reversed; however, since all of the fields of the circuit are reversed, the pointer will remain in the same position. Furthermore, so long as the salinity of the fluid remains zero, any change in temperature of the fluid or any variation in the resistance T will likewise have no effect upon the position of the pointer. While a change in the resistance T will vary the total amount of current passing therethrough and hence vary the current flowing through both coils $C_1$ and $C_2$, the relative amounts of current flowing in coils $C_1$ and $C_2$ remain the same with the result that the resultant field R of said coils, although altered in magnitude, will not be changed in direction and the pointer 11 will remain in the position shown in Fig. 1. This fixes the zero position of the pointer.

If it now be assumed that the fluid being tested is slightly saline, the resistance to the passage of current between electrodes 19 and 20 is reduced to a finite value. Under these conditions, the current flowing in the circuit passes part through the leg of the bridge containing the resistance T and part through the leg represented by the resistance B, thus tending to balance the bridge and reduce the current through the coil $C_2$. Due to the consequent reduction in the current passing through the resistance T, the current flow through the coil $C_1$ will be slightly increased. The fields of the coils $C_1$ and $C_2$ will then be of the magnitude and direction represented by the vectors $F_1$ and $F_2$ of Fig. 5, with a resultant field represented by the vector R. Since the resultant field will again tend to align itself with the main field of the fixed coils 13 and 14, the coils $C_1$ and $C_2$ will be rotated through the angle $a$, this rotation in turn moving the pointer 11 through an equal angle in a clockwise direction.

If, at this time, the temperature of the fluid in the container 18 should increase, there would result a decrease in the cell resistance B and an increase in the amount of current flowing through the corresponding leg of the bridge circuit. However, this temperature change may be manually compensated for by decreasing the variable resistance T sufficiently to result in the same unbalance of the bridge as before, and therefore the same ratio of field strengths of the coils $C_1$ and $C_2$.

If the salinity of the fluid were such that its resistance acted to balance the bridge, the current in coil $C_2$ would be zero and the resultant field of the coils $C_1$ and $C_2$ would be the field of the coil $C_1$. In this case, the coils $C_1$ and $C_2$ would be rotated from their zero positions through the angle $b$ indicated in Fig. 5 to bring the field $F_1$ of coil $C_1$ into alignment with the main field, the pointer 11 turning through a like angle from the position shown in Fig. 1. Here again any reduction in fluid resistance due to an increase in temperature would be compensated for by reducing the resistance T sufficiently to rebalance the bridge.

If the salinity of the fluid should increase beyond that sufficient to effect a balancing of the bridge, the bridge would again be unbalanced, but in a direction opposite to that previously described, and the field of the coil $C_2$ would be reversed. Under these conditions, the positions of the vectors representing the fields of the several coils, after alignment of the resultant field with that of the fixed coils, would be as shown in Fig. 6. In this case, the pointer 11 will swing even further in a clockwise direction, as viewed in Fig. 1, onto the right-hand portion of the scale 12. Any reduction in circuit resistance with an increase of temperature will still be compensated for by reducing the resistance T to produce the same degree of unbalance of the bridge as before and thereby maintain the correct pointer position.

There is thus provided by the present invention an improved salinity measuring and indicating device embodying a novel electrical circuit for producing an accurate indication of the salinity of the fluid under test, the said circuit constituting a modified form of Wheatstone bridge and including as one of the variable legs thereof a manually adjustable resistance which serves to compensate for variations in the fluid temperature. Although only one particular form of indicator has been specifically disclosed, it will be obvious that the invention is not limited thereto but is capable of a variety of mechanical embodiments. Various changes, which will now suggest themselves to those skilled in the art, may be made in the form, details of construction and arrangement of the elements without departing from the spirit of the invention. Reference is, therefore, to be had to the appended claims for a definition of the limits of the invention.

What is claimed is:

1. In a salinity measuring and indicating device, a pair of spaced electrodes adapted to be immersed in the fluid the salinity of which is to be determined, a meter for indicating the current flow between said electrodes, comprising mutually interacting fixed and movable coils, a variable resistance calibrated in terms of the temperature of the fluid being tested and manually adjustable to compensate for variations in said temperature and a fixed resistance; said electrodes, meter, variable resistance and fixed resistance being electrically connected together in the form of a Wheatstone bridge with the electrodes and variable resistance lying in parallel legs of the bridge, one of said coils constituting the bridge wire across one diagonal of the bridge, a second coil connected across the other diagonal of the bridge, and a third coil comprising a third leg of the bridge.

2. In a salinity measuring and indicating device, a pair of spaced electrodes adapted to be immersed in the fluid the salinity of which is to be determined, a meter for indicating the current flow between said electrodes including a plurality of fixed coils adapted to produce a main magnetic field, a pair of movable coils mounted in said field and having a common diameter about which they are free to rotate as an axis and an indicating member fixed with respect to said movable coils for rotation therewith about said axis, a variable resistance, and a fixed resistance said electrodes, movable coils and resistances being electrically connected together in the form of a Wheatstone bridge with the electrodes and variable resistance lying in parallel legs of the bridge and one of said movable coils constituting the bridge wire, the other movable coil and fixed resistance comprising the other two legs of the bridge.

3. In a salinity measuring and indicating device, a pair of spaced electrodes adapted to be immersed in the fluid the salinity of which is to be determined, a meter for indicating the current flow between said electrodes including a plurality of fixed coils adapted to produce a main magnetic field, a pair of movable coils mounted in said field and having a common diameter about which they are free to rotate as an axis and an indicating member fixed with respect to said movable coils for rotation therewith about said axis, a variable resistance, and a fixed resistance, said electrodes, movable coils and resistances being electrically connected together in the form of a Wheatstone bridge with the electrodes and variable resistance lying in parallel legs of the bridge and one of said movable coils constituting the bridge wire, the other movable coil and fixed resistance comprising the other two legs of the bridge, said variable resistance being calibrated in terms of the temperature of the fluid being tested and manually adjustable to compensate for variations in said temperature.

4. In a salinity measuring and indicating device, a pair of spaced electrodes adapted to be immersed in the fluid the salinity of which is to be determined, a meter for indicating the current flow between said electrodes including a pair of parallel fixed coils arranged on a common axis and adapted to produce a main energetic field, a pair of movable coils mounted in said field with their planes at right angles to one another and having a common diameter about which they are free to rotate as an axis and an indicating pointer fixed with respect to said movable coils for rotation therewith about said axis, a variable resistance, and a fixed resistance, said electrodes, movable coils and resistances being electrically connected together in the form of a Wheatstone bridge with the electrodes and variable resistance lying in parallel legs of the bridge and one of said movable coils constituting the bridge wire, the other movable coil and fixed resistance comprising the other two legs of the bridge.

5. In a salinity measuring and indicating device, a pair of spaced electrodes adapted to be immersed in the fluid the salinity of which is to be determined, a meter for indicating the current flow between said electrodes including a pair of parallel fixed coils arranged on a common axis and adapted to produce a main magnetic field, a pair of movable coils mounted in said field with their planes at right angles to one another and having a common diameter about which they are free to rotate as an axis and an indicating pointer fixed with respect to said movable coils for rotation therewith about said axis, a variable resistance, and three fixed resistances, said electrodes, movable coils and resistances being electrically connected together in the form of a Wheatstone bridge with the electrodes and variable resistance forming two of the parallel legs of the bridge and one of said movable coils constituting the bridge wire, the other movable coil being connected in series with one of the said fixed resistances to form the third leg of the bridge and the second fixed resistance completing the bridge, the third fixed resistance being shunted across said third leg of the bridge to ensure a proper division of current between said movable coils.

MORRIS FRED KETAY.
JOEL DARWIN PETERSON.